March 10, 1942.  R. H. WINDHAM  2,276,134
SEWING MACHINE SIGNAL SYSTEM
Filed Aug. 24, 1939   2 Sheets-Sheet 1

INVENTOR
Roy H. Windham
BY Carmack Waterhouse
ATTORNEY

March 10, 1942.  R. H. WINDHAM  2,276,134
SEWING MACHINE SIGNAL SYSTEM
Filed Aug. 24, 1939  2 Sheets-Sheet 2

INVENTOR
Roy H. Windham
BY Carmack Waterhouse
ATTORNEY

Patented Mar. 10, 1942

2,276,134

UNITED STATES PATENT OFFICE 2,276,134

SEWING MACHINE SIGNAL SYSTEM

Roy H. Windham, Rome, Ga., assignor to B. J. Bandy, Dalton, Ga.

Application August 24, 1939, Serial No. 291,699

3 Claims. (Cl. 161—15)

My invention relates to sewing machine signal systems and more particularly to sewing machine signal systems which indicate when sewing machines are not in operative condition and which measure the time during which they are not in operative condition.

Heretofore, operators of sewing machines, such as manufacturers of chenille or tufted textile products, have had no apparatus for indicating when a particular machine is not in operative condition and for computing the total time during which particular machines have been out of operation.

This may result in having the machine out of operation some time before an operator can locate a mechanic to fix the machine, and the operator must be depended upon to notify the mechanic. Consequently, operators of sewing machines have had no method of determining the efficiency of their machines or of the operators of the machines. A frequent excuse of unskilled or incompetent operators is that their machines have been out of operation for repairs or other reasons and that this is the cause of their failure to produce what they should produce. Employers have had no method of checking up on such excuses.

Applicant, with a knowledge of these difficulties and defects in the prior art has for an object of his invention a sewing machine signal system which has an electrical contact that is closed when the sewing machine is turned up so as to expose the sewing attachment, as is customarily done when the machine is disabled, and which will by means of said contact turn on a light indicating that the machine is disabled.

Applicant has, as a further object of his invention, a signal system that by means of the above described electrical contact will start an electric clock upon the closing of the contact and will stop said clock by the opening of said contact, so that the time during which the machine was out of operation at the end of a given period can be determined by an inspection of the time the clock has run.

Applicant has, as a further object of his invention, a signal board or signal center where electric lights and electric clocks electrically connected with a number of sewing machines are grouped together, and with the clocks and lights identified with respect to the particular machines to which they are connected, so that a considerable number of machines may be checked at any time with little trouble to determine whether they are out of use and so that at the end of a day or other chosen period, it may be easily determined from an inspection of said clocks the length of time that each machine has been out of use, and so that the mechanics will have a centralized location and may be advised without delay of the disability of any particular machines.

Applicant has, as a further object of his invention, a signal center for said machines where all clocks connected to the machines are grouped together for inspection to determine how long each machine has been out of use since the clocks were set, and where all lights connected to the machines are grouped separately from the clocks for inspection to determine at any particular time which machines are out of use.

Other objects and advantages of my invention will be pointed out in the annexed specification and the novel features thereof will be particularly pointed out in the annexed claims.

Figure 1:
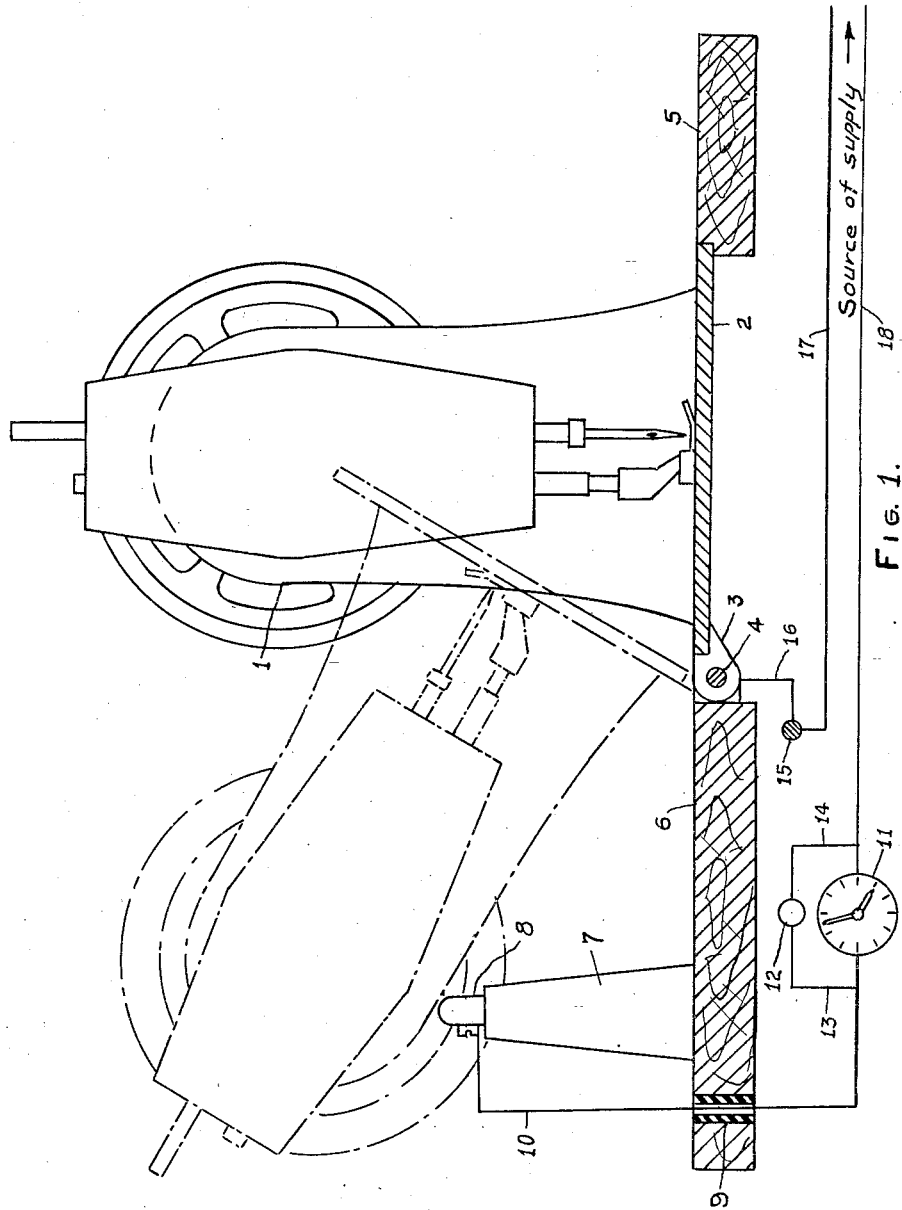
Figure 1 shows a signal system for a single sewing machine, the end of the sewing machine head away from the hand wheel being shown with cross section of the bedplate.

Referring to the drawings in detail, 1 is a conventional metal sewing machine head to which may be attached any character of sewing or tufting attachment, beneath the bedplate 2 and adjacent the presser foot and needle, not shown for convenience. 2 is the bedplate upon which the work rests, said bedplate being hinged to the rear portion 6 of the table of the sewing machine stand by hinge 3, which is pivoted upon rod 4, the hinge removably extending into the bedplate 2. When the machine is in operation, the unhinged edge of bedplate 2 closes down upon and conforms with the upper surface of the front portion 5 of the table of the stand, resting in a grooved seat of said front portion 5 so that the bedplate is level and the sewing head stands upright.

When the machine is out of use for work upon the sewing or tufting attachment, which is attached to the underside of the bedplate, the head must be turned back toward the rear portion 6 of the table by means of the hinges joined to the rear edge of the bedplate, which permits the bedplate to hinge upward thereupon, throwing the head back into the position shown by the broken lines in Figure 1. The head may be easily turned back in this manner when the machine is out of use for any reason.

A metal contact 8 is affixed to the top of a rest 7, which stands upon the rear portion 6 of the table and is sufficiently strong to support the weight of the head when it is is turned forward upon it. The contact 8 is connected to wire 10 which passes down through the rear portion 6 of the table from which it is insulated by insulating tube 9 by the screw on the contact. After emerging from beneath the table wire 10 runs to one side of the electric clock 11. A shunt line 13 connects wire 10 with a lead of light 12 just before wire 10 connects with clock 11. Wire 18 connects the other lead of clock 11 with a source of electric current and shunt line 14 connects wire 18 with the other lead of light 12. When a current passes along wires 18 and 10 clock 11 is operated thereby and light 12 is caused to burn.

A second wire 17, leading to the source of current is connected to a common ground wire 15, which may pass along a number of machines. Ground wire 15 is connected by short connecting wire 16 to the metal hinge 3 of bedplate 2.

The operation of the signal system in connection with a sewing machine is as follows:

When the machine is out of use, the metal head 1 is turned back, as shown by the broken line drawing in Figure 1, so that the metal head rests upon contact 8. This closes the circuit for current flowing through wire 18 and through clock 11 and light 12, thence through wire 10 and by means of contact 8 into metal head 1, thence through hinge 3 and connections 16 and 15, to wire 17, completing the circuit. This current operates clock 11, and causes light 12 to burn so long as the head continues to rest upon contact 8.

Figures 2, 3:
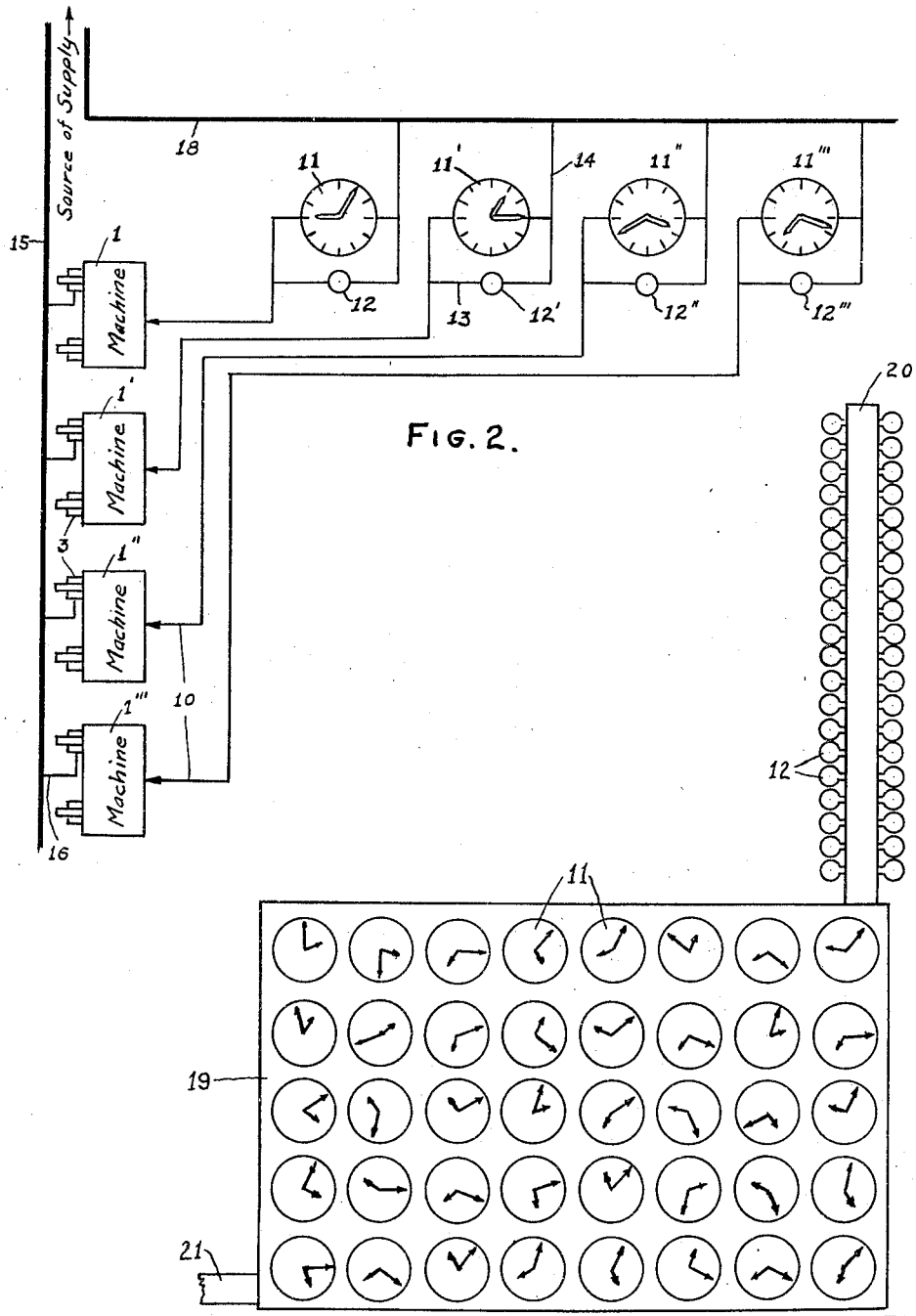
Figure 2 shows the clocks and lights of a signal system in series connected with a series of machines.
Figure 3 shows a signal center in which all of the clocks for an equal number of machines are grouped together, and the lights connected with said machines are separately grouped upon a pole.

When the machine is in use head 1 is turned upward by means of hinge 3, so that bedplate 2 is level with the table. Since the head no longer touches contact 8, the circuit is broken between contact 8 and head 1, and clock 11 ceases to operate and light 12 ceases to burn. By inspection of light 12, it may be told at any time whether head 1 is resting upon contact 8, and, therefore, whether the machine is disabled. By setting clock 11 to indicate a known time, and subsequently examining clock 11 to see how far past the set time it has gone, it may be seen what length of time clock 11 has been in operation, and, therefore, how long the machine has been out of use since clock 11 was set.

Where a number of sewing machines are operated, the clocks and lights may be grouped to form a signal center as shown in Figure 2, each clock 11, 11', 11'', and 11''', and light 12, 12', 12'', and 12''' being identified with a corresponding machine 1, 1', 1'', 1'''. This arrangement results in greater convenience in checking upon the time the machines are out of use.

Where there are a large number of sewing machines in operation, all of the clocks 11 may be mounted on a signal board 19, having conduit or tube 21 through which electric wires connecting the clocks, with the machines and current supply, enter and leave. All lights 12 with proper identification and arrangement, to indicate the machines to which they are respectively connected may be mounted on pole 20 extending above the signal board. When the signal board and pole are mounted on a wall, the clocks and lights may easily be inspected from some distance away.

If it is desired to measure the time that the machines are in use, instead of the time that they are out of use, and to indicate when they are in use, the contact closing the electric circuit may be placed so as to contact the head when it is in an upright position. The system may be adapted to machines other than sewing machines by placing a contact or switch near or upon each machine which is operated by the machine operator, or is operated automatically by the movement of the machine, so as to open and close the circuit, thus activating an electric clock and light signaling when the machine is out of use or is in use, whichever is desired.

It may be desirable to add a master clock in the system to record the sum total of all of the times the total number of machines were disabled. This may be done by inserting a time recording mechanism in series with line 18, as seen in Figure 2, adjacent the source of supply.

The source of energy is preferably alternating current, although it is possible to use direct current to supply the energy for the clocks and lamps.

Having thus described my invention, I claim:

1. A system of the character described comprising a time measuring means actuated by electrical energy, a source of electrical energy for said time measuring means, and a switch including a sewing head and a stationary contact whereby movement of said sewing head out of sewing position into engagement with said contact connects and maintains said source with said time measuring means to actuate it.

2. A signal system of the character described comprising a time measuring means, a source of electrical energy, an electrical circuit for joining said time measuring means to said source, means for opening and closing said circuit including a sewing head for movement to inoperative position to close the circuit and to operative position to open it.

3. A signal system of the character described comprising a time measuring means, a source of electrical energy, an electrical circuit for joining said time measuring means to said source, means connected in series with said source and said time measuring means for opening and closing said circuit including a sewing head for movement into inoperative position to close the circuit and to operative position to open it.

ROY H. WINDHAM.